(12) United States Patent
Symes et al.

(10) Patent No.: US 7,044,815 B1
(45) Date of Patent: May 16, 2006

(54) REMOTELY STEERABLE MOUNT FOR BOAT PROPULSION MOTOR

(76) Inventors: Ralph C. Symes, 4177 S. 1400 E., Holladay, UT (US) 84124; Christine R. Hansen, 4177 S. 1400 E., Holladay, UT (US) 84124

( * ) Notice: Subject to any disclaimer, the term of this patent is extended or adjusted under 35 U.S.C. 154(b) by 12 days.

(21) Appl. No.: 10/837,449

(22) Filed: Apr. 30, 2004

Related U.S. Application Data

(60) Provisional application No. 60/471,484, filed on May 19, 2003.

(51) Int. Cl.
*B60L 15/20* (2006.01)

(52) U.S. Cl. .......................................................... 440/7
(58) Field of Classification Search ..................... 440/7
See application file for complete search history.

(56) References Cited

U.S. PATENT DOCUMENTS

| | | | | |
|---|---|---|---|---|
| 3,968,768 A | * | 7/1976 | Solt | 440/62 |
| 4,614,900 A | * | 9/1986 | Young | 318/16 |
| 5,029,547 A | * | 7/1991 | Novey | 114/159 |
| 5,217,395 A | * | 6/1993 | Bailey et al. | 439/668 |
| 5,358,434 A | * | 10/1994 | Brown | 440/60 |
| 5,892,338 A | * | 4/1999 | Moore et al. | 318/16 |

* cited by examine

*Primary Examiner*—Jesus D. Sotelo
(74) *Attorney, Agent, or Firm*—Brian C. Trask

(57) ABSTRACT

A mounting arrangement for a boat's propulsion motor that permits steering of the boat by remote control. A preferred embodiment includes a bracket for attachment to a boat, and a steerable mounting plate to hold the motor. An orientation of the mounting plate is adjusted by an electric motor adapted to rotate a pinion gear for engagement with an arcuate rack gear. Desirably, a portable wireless control cooperates with a receiver including steering-control circuitry to effect operation of the steering motor. In one aspect of the invention, the receiver is structured for tool-free decoupling from the arrangement to provide theft security. It is also desirable to include a polarity-control circuit to resist damage to the steering-control circuitry by application of an electric power signal of improper polarity.

19 Claims, 4 Drawing Sheets

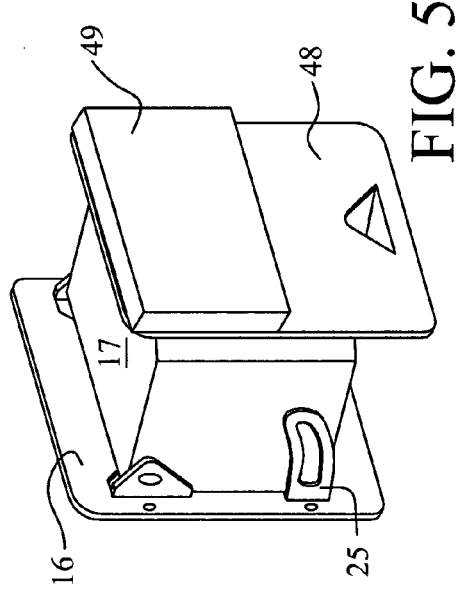
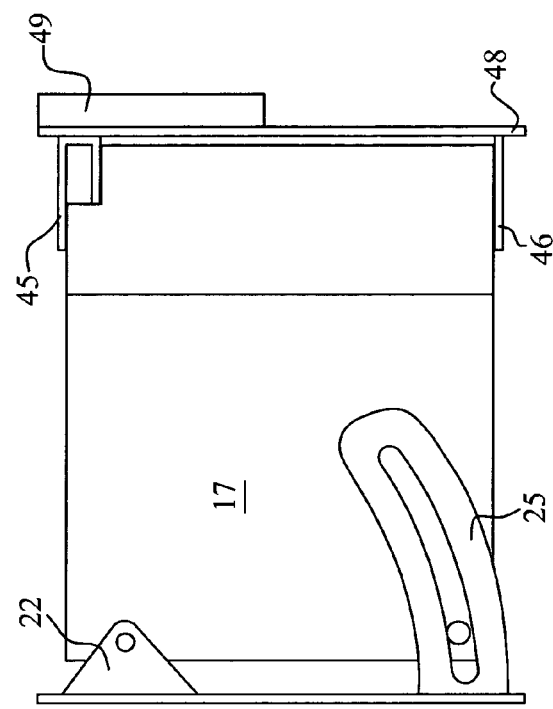
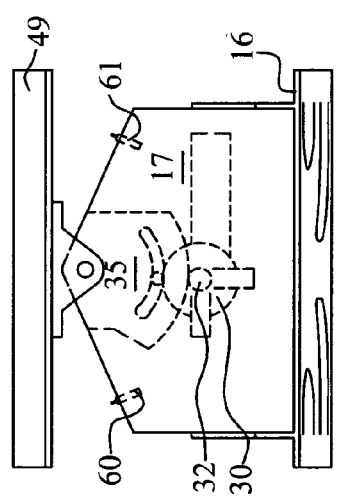
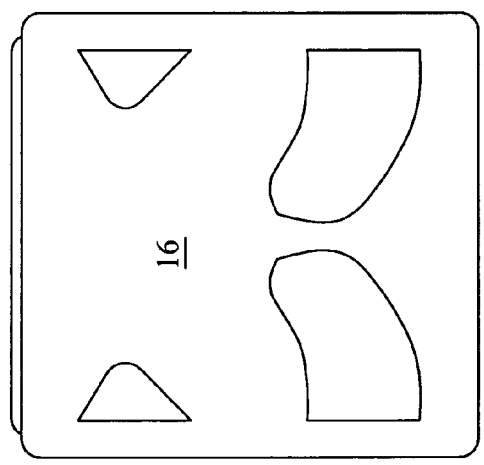
FIG. 5
FIG. 4
FIG. 2
FIG. 3

REMOTELY STEERABLE MOUNT FOR BOAT PROPULSION MOTOR

RELATED APPLICATIONS

This application claims the benefit under 35 U.S.C. 119(e) of the filing date of Provisional Application Ser. No. 60/471,484, filed May 19, 2003, for "Remote-controlled mount for boat motor."

BACKGROUND

1. Field of the Invention

This invention relates to apparatus for mounting a propulsive motor to a boat. It is particularly directed to a motor mounting arrangement that is steerable by use of a portable control apparatus disposable at a variety of locations remote from the propulsive motor.

2. State of the Art

Outboard motors are well known in the sport of boating for their use as propulsion sources for boats. For the purpose of this disclosure, the term "outboard motor" is intended nonexclusively to encompass propulsive motors powered by gasoline and electricity. Outboard motors are used in all sorts of boats, of all sizes. Commonly, outboard motors may be additionally included on certain boats having other motors as a primary propulsive source, such as an inboard/outboard motor, for use as an auxiliary back-up motor or as a trolling motor. Certain sailboats may include an outboard motor as a kicker motor to maneuver in a docking procedure, or in the event that the wind ceases and movement of the sailboat is desired.

Steering of a boat when using an outboard propulsion motor commonly requires an operator to sit in close proximity to the outboard motor and hold a throttle lever that is also operable directly to rotate the motor for steering. Certain outboard motors may be equipped with a cable harness (or other arrangement) to permit a boat operator to steer from a dedicated location using a permanently mounted steering wheel adapted to operate the cable harness and turn the motor with respect to the boat. However, such a dedicated location limits a boat operator's freedom in moving about a boat while maintaining steering control. The fixed positions for steering a conventionally mounted outboard boat motor can be uncomfortable, or simply inefficient.

For example, in certain circumstances, it can be desirable for a boat operator to position him/herself at a bow of a boat to observe a depth of water prior to maneuvering the boat past certain bottom structure. In a fishing situation, it may be desirable for a boat operator to stand at a variety of locations dispersed about the boat during the course of a single fishing outing, while maintaining steering control of the boat. In a sailing situation, the skipper may desire to maintain steering control of a sailboat while physically located at a variety of positions in the boat; perhaps to attend to sail dropping, or daggerboard retracting, or to multitask at some other activity.

In response to a need, certain steerable motor mounts have been developed. One exemplary such device is sold commercially under the trade name "Remote Troll". As understood, the Remote Troll devices employ a steering controller that is tethered to the motor by an electric cable extension. The cable extension provides a measure of freedom of position for a boat operator, as a boat's operator may move about within a radius defined by a length of the tether. Steering of the motor is arranged through a spooled steering cable arrangement adapted to rotate the motor mounting plate with respect to a boat.

It would be an advance to provide a steerable motor mount that provides reliable remotely-controlled and untethered steering of an outboard propulsive motor for a boat from a plurality of location dispersed about a boat. A desirable advance would provide a sturdy and reliable linkage system operable to steer the outboard motor. A further advance would desirably provide a wireless remote-control system operable to control a steering motor to steer a boat. An improved control system desirably would include provisions to resist application of improper polarity of a signal from an electric power source to certain portions of the control circuitry.

BRIEF SUMMARY OF THE INVENTION

The present invention provides an improved apparatus for remote-controlled steering of a boat. One embodiment, constructed according to principles of the invention, includes a bracket adapted for attachment to structure associated with a boat, a mounting plate suspended from the bracket and adapted to hold a propulsion motor, and an electrically powered steering motor operably arranged to rotate the mounting plate with respect to the bracket. The mounting plate is arranged to rotate about a substantially vertical axis to effect a steering adjustment. Desirably, the mounting plate may be rotated about a horizontal axis to adjust a pitch of the propulsion motor with respect to the boat. A preferred embodiment includes a steering motor housing assembly pivotally connected to the bracket to permit adjustment of a first angular orientation of the mounting plate with respect to the bracket and thereby adjust the pitch of the propulsion motor.

Desirably, the mounting plate and bracket are coupled by linkage having a gear-on-gear coupling adapted for moving the mounting plate with respect to the bracket. A gear-on-gear coupling provides a durable and sturdy coupling for substantially trouble-free operation over a long life of the apparatus. An operable gear coupling includes a rack-and-pinion assembly, with the pinion gear being rotated by the steering motor. To avoid burnout of the steering motor, or draining the battery, it is sometimes desirable to include a plurality of limit switches configured and arranged to de-energize the steering motor at either of an extreme left or right turn position while permitting a reverse direction signal to energize the steering motor.

Usually, the steering motor is controlled using a remote-control device disposable at a plurality of locations in the boat. An operable remote-control device includes a transmitter capable of emitting a signal for wireless reception by a receiver and a receiver configured and arranged to effect a steering input to the steering motor responsive to that signal. The receiver is arranged for connection to a direct current power source, such as a 12 volt automotive or marine lead-acid battery. In some cases, it is desirable to include polarity-control circuitry adapted to ensure that an electric signal received from the 12 volt battery is applied with consistent polarity to a portion of steering-control circuitry.

It is sometimes desirable to remove the receiver from a boat for theft protection. In such case, the receiver may include structure arranged to form a tool-free, removable connection with a steering control cable adapted to provide electrical communication with the steering motor. Also, power supplied to the receiver from a direct current power source may effected through a power supply cable including structure arranged to permit a tool-free disconnection of the receiver from the power source. Preferably, the steering control cable comprises a first plug having a first connection configuration structured for removable connection to first receiving structure associated with the receiver. Of further benefit is to structure the power supply cable to include a second plug having a second connection configuration structured for removable connection to second receiving structure associated with the receiver. Also, the first and second connection configurations desirably are differently structured to resist connection of the first plug to the second receiving structure.

A typical transmitter includes control apparatus arranged to produce a plurality of control signals including a first control signal operable to cause a steering input (or command to the steering motor) in a first direction, and a second control signal operable to cause a steering input in a second direction. In some cases, the plurality of control signals further includes a third control signal operable as a kill-switch to shut off the propulsion motor. Also, it is within contemplation to provide control apparatus operable to manipulate a throttle setting of the propulsion motor.

Control apparatus for generating steering control signals may be arranged as a plurality of buttons, slide-action levers, or as a toggle switch. An exemplary transmitter is arranged somewhat similar to a key fob, and may include a quick-connect device operable to suspend the transmitter from convenient portions of a user's clothing, such as a belt loop.

The invention can be embodied in many configurations to form an improved remote-controlled steerable mounting arrangement for a boat's propulsion motor. Such mounting arrangement typically includes a mounting plate coupled to a linkage system adapted to suspend the propulsion motor at an operable position with respect to structure associated with the boat. Furthermore, the mounting plate is pivotable about an axis to permit remote-controlled steering of the boat by action of a steering mechanism disposed to adjust an orientation of the mounting plate responsive to a steering signal from a control transmitter. The improvement includes polarity-control circuitry, operably disposed in circuit with steering-control circuitry arranged to actuate a portion of the steering mechanism, and adapted to ensure that an electric signal received from a power source is applied with consistent polarity to a portion of the steering-control circuitry.

One such improved steering mechanism arrangement includes a steering motor operable to effect a relative orientation of the mounting plate with respect to the bracket, and further includes a plurality of limit switches configured and arranged to de-energize the steering motor at either of an extreme left or right turn position while permitting a reverse direction signal to energize the steering motor.

In a preferred embodiment of the improved apparatus, the steering signal is transmitted as a wireless signal, which can be UHF or infrared. A receiver desirably is adapted to receive the wireless steering signal and is arranged for communication with the steering motor through a steering cable, and to receive power from a direct current power source through a power cable. It is currently preferred for the steering control cable to include a first plug having a first connection configuration structured for removable connection to first coupling structure associated with the receiver. It is also preferred for the power supply cable to include a second plug having a second connection configuration structured for removable connection to second coupling structure associated with the receiver. Furthermore, the first and second connection configurations desirably are differently structured to resist connection of the first plug to the second coupling structure. The resulting receiver may be disconnected from a boat in a tool-free operation by a user to provide theft protection of both the boat and steering control system.

The improved apparatus generally includes a linkage system having a bracket adapted for attachment to structure associated with the boat. A mounting plate is disposed for rotation with respect to the bracket about a substantially vertical axis to effect a steering adjustment on a propulsion motor suspended by the mounting plate. The mounting plate is oriented for steering the boat by a steering motor. An operable steering motor includes an electrically powered motor of the type used to open and close automobile windows. The steering motor is operably arranged, in certain preferred embodiments, to rotate a drive gear disposed for meshing engagement with a section of driven gear teeth effective to rotate the mounting plate with respect to the bracket to effect the steering adjustment.

The invention may broadly be characterized as providing an apparatus operable to provide remote-controlled steering of a propulsion motor for a boat. Certain embodiments include a linkage arrangement including a rack-and-pinon interface. The linkage is disposed between structure associated with the boat and structure associated with the propulsion motor operably to orient a direction of thrust from the propulsion motor with respect to the boat. An electrically powered steering motor is disposed to rotate a pinion gear of the rack-and-pinion interface responsive to a control input. An operable linkage arrangement includes an arm pivotally connected at a first end to a propulsion motor, with a position of the pivot location being determined by a steering motor and a rack disposed at a second end of the arm.

Also included in certain preferred embodiments of the invention is a steering control receiver in communication with the steering motor and operable to effect a direction of rotation of the steering motor responsive to a steering command transmitted by a user. The steering control receiver is operated by a portable steering control transmitter. Conveniently, the transmitter can be moved to a plurality of locations in the boat, and transmit a steering command to the receiver from any of those locations. It is currently preferred for the steering command to be transmitted as a wireless radio (UHF) signal.

BRIEF DESCRIPTION OF THE DRAWINGS

In the drawings, which illustrate what are currently considered to be the best modes for carrying out the invention:

FIG. 2 is a top view, in skeletal outline, of an assembled motor mount;

FIG. 3 is a front view in elevation of the motor mount of FIG. 2;

FIG. 4 is a side view in elevation of the motor mount of FIG. 2;

FIG. 5 is a perspective view of the motor mount of FIG. 2;

DETAILED DESCRIPTION OF THE ILLUSTRATED EMBODIMENTS

Figure 1:
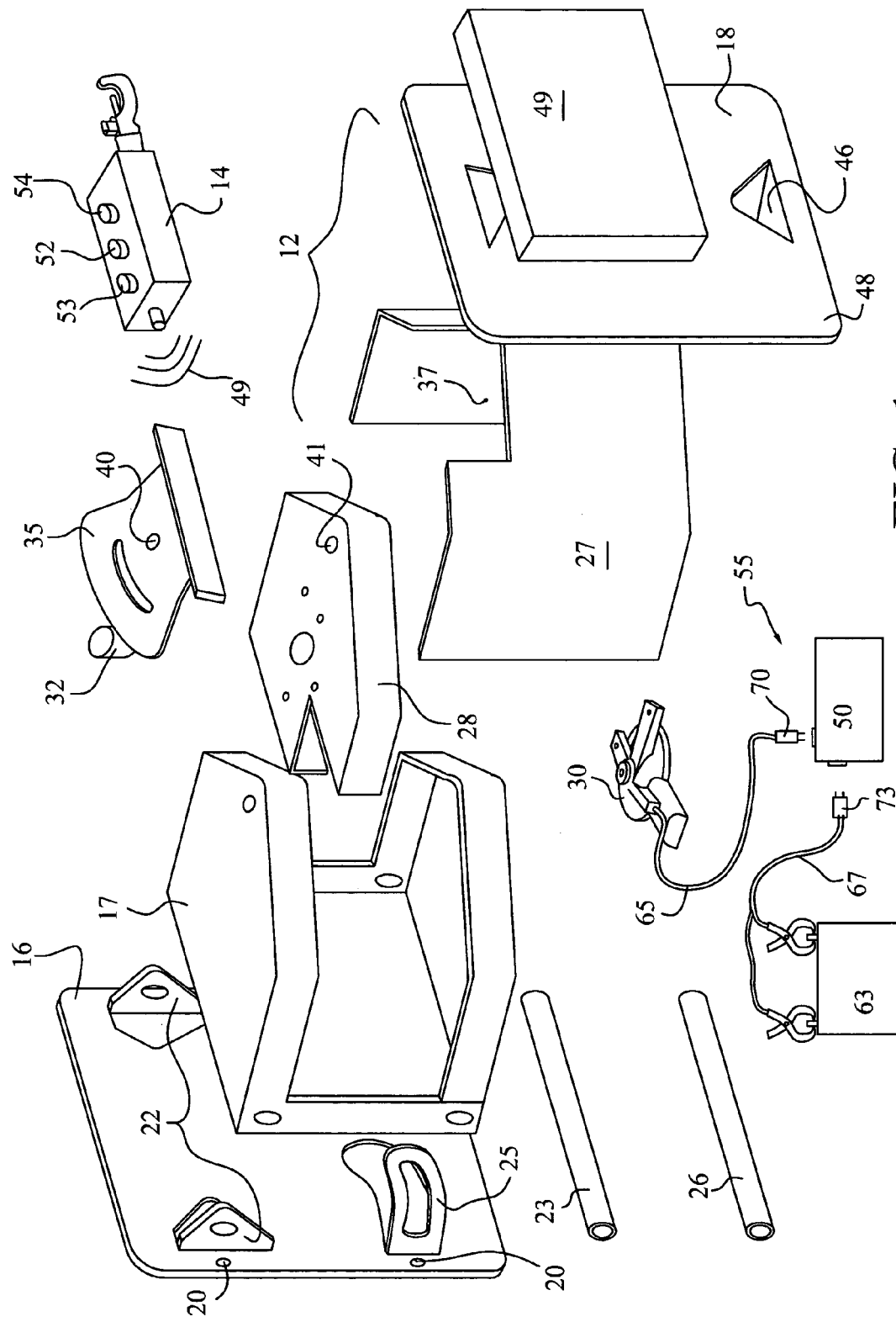
FIG. 1 is an exploded assembly view in perspective of a currently preferred embodiment of the invention.

Broadly, the present invention provides an apparatus for remotely steering a boat's propulsion motor while an operator is riding in the boat and located at a distance from the motor. The apparatus illustrated in FIG. 1 includes a steerable motor mount, generally indicated at 12, and a remote control device 14. While remote control device 14 is representative of those devices that may be characterized as "wireless", certain embodiments of the invention may also be practiced using alternative controllers. One alternative remote control mechanism within contemplation is a controller of the type that is operably tethered to the steering actuator assembly by an umbilical cable arrangement.

The illustrated motor mount 12 includes: boat attachment bracket 16, steering-motor housing 17, and propulsion motor mounting plate 18. Boat bracket 16 is adapted for attachment to a boat, typically at the boat's transom area, by placing a fastener through each of a plurality of mounting holes 20 for their engagement in structure of the transom. However, attachment of bracket 16 having an alternate and cooperating shape to other locations, such as to a swim platform or alternative structure located at a stern of a boat, or even to structure disposed at a midsection or bow portion of a boat, is also within contemplation. Certain operable attachment arrangements may be constructed to permit tool-free removal of the bracket 16 from engagement with structure associated with the boat. For example, a threaded shaft can be arranged to form a clamp operable to engage structure associated with a boat bracket in a fixed relationship at a received location on structure associated with a boat.

Desirably, an angular adjustment is provided in a propulsion motor mounting arrangement operable to permit a user to orient an axis of the propulsion motor effective to place the propulsion motor in proper trim with the boat. A desired trim orientation places a thrust vector from the propulsion motor into a plane disposed substantially in parallel with a plane containing a vector defining a direction of travel of the boat. For purpose of this disclosure, such trim may be referred to as a pitch adjustment.

One mounting arrangement operable to adjust the pitch of a propulsion motor is illustrated in FIG. 1, where steering-motor housing 17 is arranged in cooperation with bracket 16 to permit adjustment of a first angular orientation of housing 17 with respect to the boat. The first angular orientation of housing 17 is with respect to rotation about a first horizontal axis, disposed generally transverse to a forward direction of travel of the boat. As illustrated, motor mounting plate 18 is associated with housing 17 in such a way that adjusting the first angular orientation of housing 17 correspondingly adjusts a first angular orientation of mounting plate 18. Adjustment of this first angular orientation optionally may be provided as one way to adjust trim of the propulsion motor.

In the embodiment illustrated in FIG. 1, a pivot axis is established at the top of housing 17 by flanges 22, spacer 23, and a bolt (not illustrated) placed therethrough. The bottom of housing 17 can be rotated through an arc about the spacer 23, and can be affixed in a desired pitch orientation with respect to a boat by a second through-bolt (not illustrated) passing through bottom flanges 25, housing 17, and spacer 26. Of course, FIG. 1 illustrates only one operable, and currently preferred, adjustable mounting arrangement. It is to be recognized that many alternative linkage arrangements may be structured to permit a user to adjust an orientation of a propulsion motor with respect to a boat to effect a proper trim.

A second angular orientation of the propulsion motor mounting plate 18, about a steering axis disposed generally vertical and orthogonal to the first horizontal axis, is adjustable to control a direction of thrust of the propulsion motor for steering the boat. In use of the invention, a commercially available outboard motor typically is affixed to the mounting plate 18. Rotation of the outboard motor itself, with respect to the plate 18 and about the outboard motor's conventional steering axis, is restrained. In a preferred embodiment of the invention, steering of the boat is controlled by orientating mounting plate 18 with respect to the boat. The direction of thrust of the propulsion motor typically remains approximately normal to a plane parallel to a surface of mounting plate 18. Therefore, rotating mounting plate 18 about a steering axis is operable to change a direction of thrust of the propulsion motor, and thereby to steer the boat.

Housing 17 typically includes a cover plate 27, and a motor shelf 28, which is adapted to hold a steering-motor 30. An exemplary motor 30 is also used in the automotive industry to raise and lower a vehicle's window. Preferred steering motors are electrically powered by direct current delivered at 12 volts. However, other motors powered by other energy sources are also operable in certain embodiments of the invention. Serviceable motors include electric motors powered by direct or alternating current delivered at any practical voltage (e.g. about 6 volts to about 120 volts, or more), although 24 volts is believed to be a reasonable upper limit in marine applications. Hydraulic and internal combustion motors may also be adapted to operate as workable steering motors. It is preferred for a steering motor to be resistant to damage, resulting from contact with water, for extended operation in a marine environment.

Figure 6:
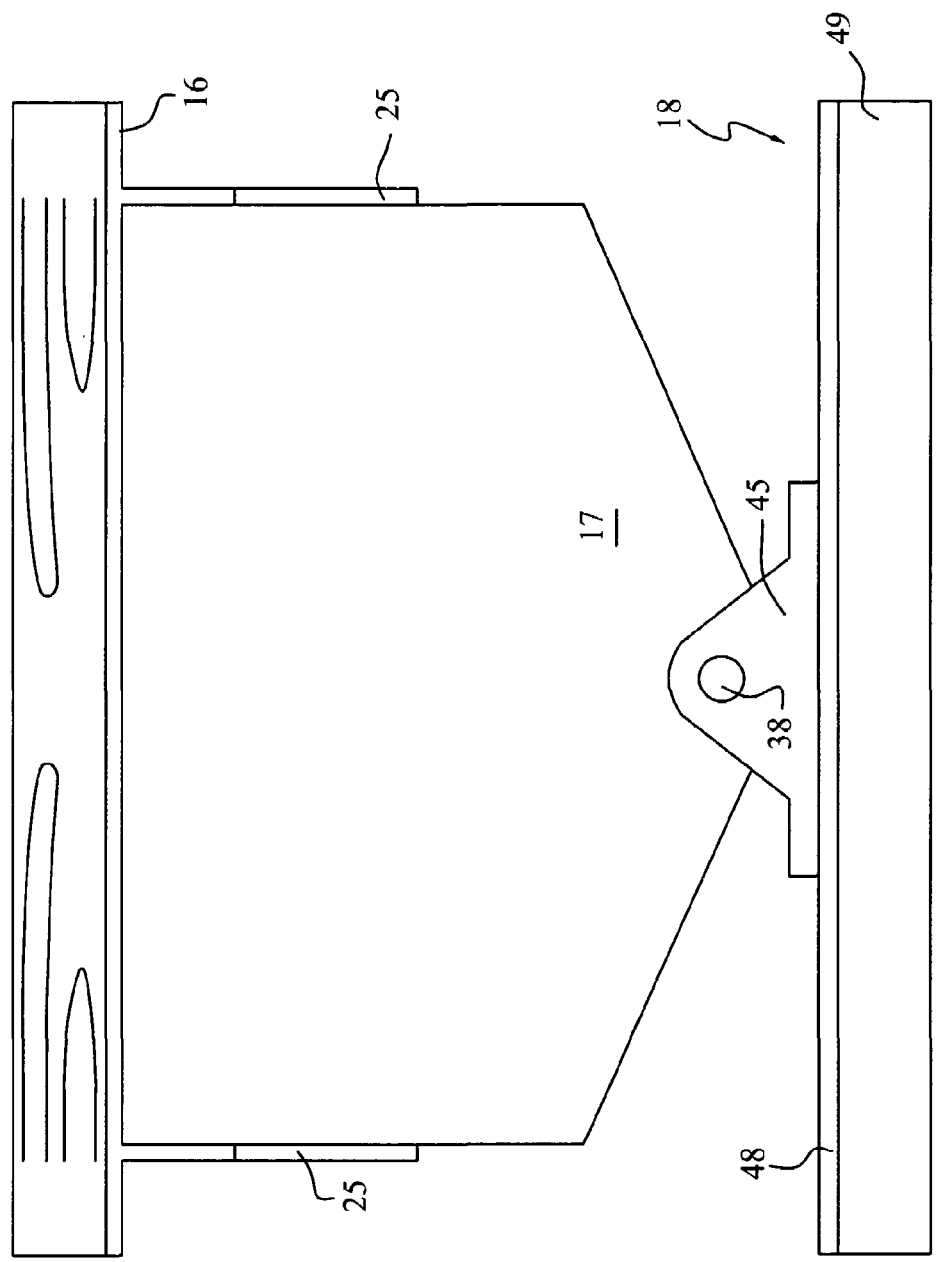
FIG. 6 is a top view of an assembled motor mount.

In the preferred embodiment illustrated in FIG. 1, motor 30 drives pinion gear 32 to move arcuate rack 35. Rack 35 is assembled in association with housing 17 to pass through opening 37 in cover plate 27. A vertical king-pin 38 (see FIG. 6) passes through pivot hole 40 in rack 35, and pivot hole 41 in shelf 28, to define a pivot axis for rack 35 with respect to housing 17. The housing assembly, including housing 17, forms a splash-resistant cover, but is not relied upon for waterproof protection of the steering motor 30, or other components contained inside the housing assembly.

The illustrated rack-and-pinion arrangement provides a leverage-enhancing mechanism for the steering motor, and forms a positive and sturdy coupling between the steering motor 30 and mounting plate 18. It is also within contemplation for a steering motor 30 to be coupled to mounting plate 18 through alternative linkage arrangements. Preferred coupling is made through a gear-on-gear linkage arrangement, including a plurality of cooperatively structured and arranged gears, or a rack-and-pinion linkage. A linkage arrangement may also be formed using a belt or cable to drive mounting plate 18 in response to an output from steering motor 30. It is also within contemplation for a bracket containing a rack 35 to be attachable directly to a propulsion motor in an alternative operable embodiment of the invention.

In the currently preferred embodiment, rack 35 is affixed to boat-motor mounting plate 18 to impart steering motion to plate 18. The king pin 38 also defines a pivot axis for propulsion motor mounting plate 18 by passing through flange 45 and bottom flange 46. Therefore, motion of rack 35 under influence of gear 32 causes a corresponding arcuate movement of propulsion motor mounting plate 18 effective to steer a boat being propelled by the outboard motor.

Propulsion motor mounting plate 18 typically includes a metal substrate plate 48 and a spacer element 49 cooperatively sized to engage with mounting structure of commercially available outboard motors. Flanges 45 and 46 may conveniently be made by stamping (or cutting and bending) from material forming the plate 48, or using any other operable manufacturing method, such as welding a flange to the baseplate 48. (Other flanges, such as 22 and 25 in mounting bracket 16 may be formed using corresponding operable techniques). Spacer 49 is generally included to provide a mounting thickness in conformance with typical mounting requirements of an outboard-type boat-motor. Typically, spacer 49 is made from wood, or a material having similar structural properties to permit holding the weight of an outboard motor, and a resistance to damage from contact with water or other liquids associated with a boat.

While the FIGs. generally illustrate details of an embodiment of the invention having a steering motor suspended in a substantially stationary position with respect to the boat and arranged to pivot the boat mounting bracket, the reverse is also workable. That is, the motor may, in certain less preferred embodiments, by arranged to travel with the motor mounting plate.

Another alternative embodiment within contemplation includes an electrically powered steering motor disposed to rotate a pinion gear of a rack-and-pinion component of a linkage system operable to steer an outboard motor responsive to a control input. In such an embodiment, the outboard motor may be mounted on a fixed mounting plate or the transom of a boat, and that outboard motor is rotated about its conventional steering axis by the linkage system. An operable linkage arrangement includes an arm pivotally connected at a first end to a junction associated with the propulsion outboard motor, with a position of the junction location being determined by the steering motor and a gear rack disposed at a second end of the arm. Ideally, the steering motor attachment with respect to the boat is arranged to permit an outboard motor to be stowed in a rotated position, with its propeller out of the water, without requiring disassembly of any steering linkage. The junction may be of the type characterized as a quick-connect, and may form a tool-free disconnect to permit removal of the outboard motor for use in a different application, or for storage or transport of the motor. The control input may be responsive to a wireless signal, or to input generated by a tethered portable steering controller.

Since the invention generally is used in a wet environment, the metal parts desirably are made from a rust resistant material, or typically are treated to resist rusting. It is currently preferred to form the rack-and-pinion components from a wear resistant stainless steel alloy.

Remote control transmitter 14 is operable to emit a control signal 49 for reception by receiver 50 to impart steering inputs to motor 30. Operable controls with which transmitter 14 can steer a boat include buttons 52 and 53. Button 52 can be depressed by a user to make a starboard turn in the boat. Correspondingly, button 53 can be depressed to make a port turn. A joystick or toggle switch can alternatively be used to effect the same result. One or more additional controls may be included on a transmitter 14, such as button 54. In one circumstance, button 54 may be adapted as a kill-switch to shut off the propulsion motor while at a location remote from the motor.

Control signal 49 can be infrared (IR), radio frequency waves, or any other operable type of signal. However, it is currently preferred that the signal is transmittable through the atmospheric air, to avoid tethering the device 14 to the receiver 50 by a wire. Certain embodiments of motor mounts 12 incorporate position-controlling limit switches (60, 61 see FIG. 2) to resist burnout of a motor 30 caused by continuous turn input from device 14 in a given direction. Such switches typically de-energize the motor 30 at either of an extreme left or right turn position, but still permit a reverse direction signal to energize the steering motor 30.

Receiver 50 can be mounted at any convenient location on the boat, and a wire system, generally indicated at 55, can be routed to the motor 30. It should be noted that receiver 50 is typically connected in a conductive path between a direct current power source, such as battery 63 and the motor 30. The currently preferred wire system 55 includes a steering cable 65 and a power supply cable 67. In certain circumstances, such as for a theft deterrent, it is desirable to facilitate removal of the receiver 50 from a boat. In such case, a plug 70 may provided on one end of steering cable 65 to facilitate forming a tool-free electrical connection with cooperating structure of receiver 50. Power cable 67 may similarly have a plug end 73, or a disconnection may be made at alligator clips, or other structure at battery 63. When both of plugs 70 and 73 are present, it is preferred that each plug is differently structured to resist forming improper connections with the receiver.

When receiver 50 is operable to receive IR signals, it is generally desirable to locate at least an antenna portion of receiver 50 in a convenient line-of-sight location from a variety of positions of a transmitter 14 on the boat. It is recognized that a control system using radio frequency waves provides a more forgiving requirement for a mounting location of receiver 50.

A currently preferred steering control system includes a rolling code 2-channel UHF remote control transmitter and receiver commercially available as a kit under the part number CK1617 from Carl's Electronics, Inc., having a mailing address of P.O. Box 182, Sterling Mass. 01564. Full details about the circuitry, and an explanation of rolling code are found on the world wide web in ck1616.pdf located at http://www.electronickits.com/kit/complete/elec/ck1616.htm. The disclosure of ck1616.pdf is hereby incorporated herein as though set forth in its entity.

Figure 7:
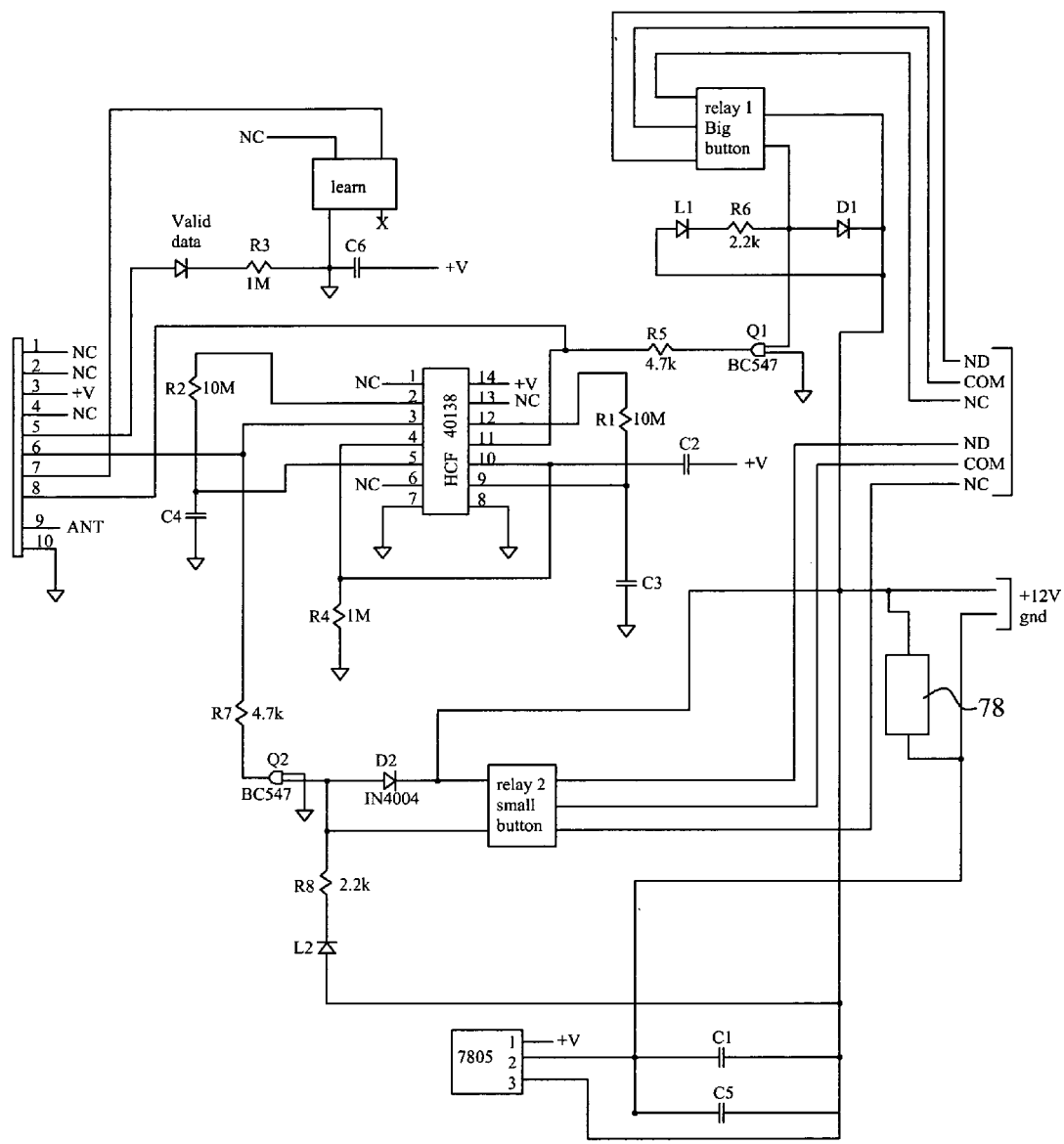
FIG. 7 is an electrical schematic illustrating one operable remote-control receiver device.

The receiver portion of the CK1617 kit is modified by placing jumpers to enable momentary-type control, so that a steering input will only be passed to the motor 30 while a steering button 52 or 53 is depressed. Additional jumpers are placed between the terminal block pins and the relay pins to carry the current drawn by the motor 30 when making a steering adjustment. As illustrated in FIG. 7, it is further preferred to modify the kit by adding a full wave bridge diode 78 effective to resist application of an electric signal having an improper polarity to the control circuit. An operable full wave bridge diode includes the 2 amp, 400 volt component commercially available under part number NTE 168 from Standard Supply Electronics, having a place of business at 3424 South Main Street, Salt Lake City, Utah 84115.

While the invention has been described in particular with reference to certain illustrated embodiments, such is not intended to limit the scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A remotely-steerable motor mount assembly for a boat's propulsion motor, comprising:
    a bracket adapted for attachment to structure associated with said boat;
    a mounting plate arranged to rotate about a substantially vertical axis to effect a steering adjustment of said propulsion motor suspended therefrom;

an electrically powered steering motor operably arranged, through a gear coupling comprising a driven gear disposed for rotation about said substantially vertical axis, effective to rotate said mounting plate with respect to said bracket to effect said steering adjustment; and a remote-control device disposable at a plurality of locations in said boat and operable to actuate said steering motor.

2. The assembly according to claim 1, wherein:
said gear coupling comprises a rack-and-pinion assembly.

3. The assembly according to claim 1, further comprising:
a steering motor housing assembly pivotally connected to said bracket to permit adjustment of a first angular orientation of said mounting plate with respect to said bracket, wherein:
said mounting plate is arranged to rotate through an arc about a substantially vertical steering axis passing through said housing.

4. The assembly according to claim 3, wherein:
said first angular orientation is effected by rotating said mounting plate about an axis disposed approximately normal to said steering axis.

5. The assembly according to claim 1, further comprising:
a plurality of limit switches configured and arranged to de-energize said steering motor at either of an extreme left or right turn position while permitting a reverse direction signal to energize said steering motor.

6. The assembly according to claim 1, wherein:
said remote-control device comprises a transmitter capable of emitting a signal for wireless reception by a receiver; and
said receiver is configured and arranged to effect a steering input to said steering motor responsive to said signal.

7. The assembly according to claim 6, wherein:
said receiver is arranged for connection to a direct current power source, and comprises polarity-control circuitry adapted to ensure that an electric signal received from said power source is applied with consistent polarity to a portion of steering-control circuitry.

8. The assembly according to claim 6, wherein:
said receiver comprises structure arranged to form a tool-free, removable connection with a steering control cable adapted to provide electrical communication with said steering motor; and wherein:
power supplied to said receiver from a direct current power source is effected through a power supply cable comprising structure arranged to permit a tool-free disconnection of said receiver from said power source.

9. The assembly according to claim 8, wherein:
said steering control cable comprises a first plug having a first connection configuration structured for removable connection to first receiving structure associated with said receiver;
said power supply cable comprises a second plug having a second connection configuration structured for removable connection to second receiving structure associated with said receiver, wherein:
said first and second connection configurations are differently structured to resist connection of said first plug to said second receiving structure.

10. The assembly according to claim 6, wherein:
said transmitter comprises control apparatus arranged to produce a plurality of control signals comprising:
a first control signal operable to cause a steering input in a first direction; and
a second control signal operable to cause a steering input in a second direction.

11. The assembly according to claim 10, said plurality of control signals further comprising a third control signal operable as a kill-switch to shut off said propulsion motor.

12. The assembly according to claim 10, wherein said control apparatus comprises a plurality of buttons, comprising:
a first button operable to cause a steering input in a first direction; and
a second button operable to cause a steering input in a second direction.

13. The assembly according to claim 10, wherein:
said control apparatus comprises a toggle switch, wherein:
actuating said toggle switch in a first direction causes a steering input to turn said boat in a first direction; and
actuating said toggle switch in a second direction causes a steering input to turn said boat in a second direction.

14. In a mounting arrangement for a boat's propulsion motor of the type including a mounting plate coupled to a linkage system adapted to suspend the propulsion motor at an operable position with respect to structure associated with the boat and with the mounting plate being pivotable about an axis to permit remote-controlled steering of the boat by action of a steering mechanism disposed to adjust an orientation of the mounting plate responsive to a signal from a control transmitter, the improvement comprising:
polarity-control circuitry, operably disposed in circuit with steering-control circuitry arranged to actuate a portion of said steering mechanism, and adapted to ensure that an electric signal received from a power source is applied with consistent polarity to a portion of said steering-control circuitry, irrespective of the polarity of said applied electric signal from said power source.

15. The arrangement according to claim 14, wherein:
said steering mechanism comprises a steering motor operable to effect a relative orientation of said mounting plate with respect to said bracket; and
said arrangement further comprises a plurality of limit switches configured and arranged in circuit with said steering control circuitry effective to de-energize said steering motor at either of an extreme left or right turn position while permitting a reverse direction signal to energize said steering motor.

16. The arrangement according to claim 15, wherein:
said signal is transmitted as a wireless signal;
said steering mechanism further comprises a receiver adapted to receive said wireless signal and arranged for communication with said steering motor through a steering cable, and to receive power from a direct current power source through a power cable;
said steering control cable comprises a first plug having a first connection configuration structured for removable connection to first coupling structure associated with said receiver;
said power supply cable comprises a second plug having a second connection configuration structured for removable connection to second coupling structure associated with said receiver, and wherein:
said first and second connection configurations are differently structured to resist connection of said first plug to said second coupling structure.

17. The arrangement according to claim 16, wherein:

said linkage system comprises a bracket adapted for attachment to structure associated with said boat;

said mounting plate is disposed for rotation with respect to said bracket about a substantially vertical axis to effect a steering adjustment on said propulsion motor suspended therefrom; and said steering motor comprises an electrically powered motor operably arranged to rotate a drive gear disposed for meshing engagement with a section of driven gear teeth effective to rotate said mounting plate with respect to said bracket to effect said steering adjustment.

18. An apparatus operable to provide remote-controlled steering of a propulsion motor for a boat, comprising:

a linkage arrangement including a rack-and-pinon interface comprising a driven gear disposed for rotation about a substantially vertical axis said linkage being disposed between structure associated with said boat and suspension structure associated with said propulsion motor operably to orient a direction of thrust from said propulsion motor with respect to said boat by rotation of said suspension structure about said substantially vertical axis;

an electrically powered steering motor disposed to rotate a pinion gear of said rack-and-pinion interface responsive to a control input;

a steering control receiver in communication with said steering motor and operable to effect a direction of rotation of said steering motor responsive to a steering command transmitted by a user; and a portable steering control transmitter operable at a plurality of locations in said boat to transmit a said steering command to said receiver, wherein:

said steering command is transmitted as a wireless radio signal from a hand-held portable transmitter comprising a quick-connect operable for attachment of said transmitter to a belt loop of an operator's clothing;

said steering control receiver is arranged for communication with said steering motor through a steering cable, and to receive power from a direct current power source through a power cable;

said steering control cable comprises a first plug having a first connection configuration structured for removable connection to first coupling structure associated with said receiver;

said power supply cable comprises a second plug having a second connection configuration structured for removable connection to second coupling structure associated with said steering control receiver, and wherein:

said first and second connection configurations are differently structured to resist connection of said first plug to said second coupling structure.

19. The apparatus according to claim 18, said steering control receiver further comprising:

polarity-control circuitry, operably disposed in circuit with steering-control circuitry arranged to actuate said steering motor, adapted to ensure that an electric signal received from a power source is applied with consistent polarity to a portion of said steering-control circuitry.

* * * * *